No. 685,830. Patented Nov. 5, 1901.
J. F. FASENMEYER.
CHECKREIN HOLDER.
(Application filed May 2, 1901.)
(No Model.)
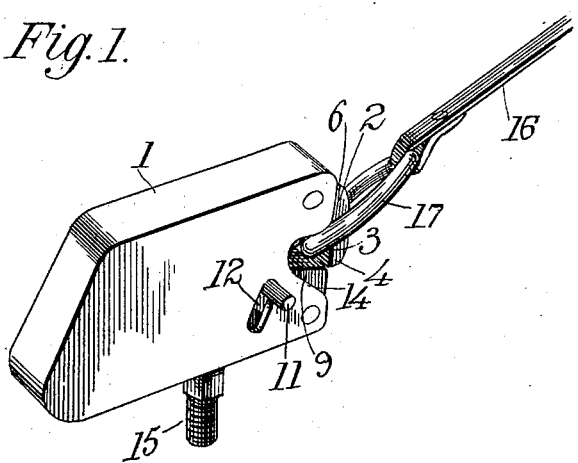
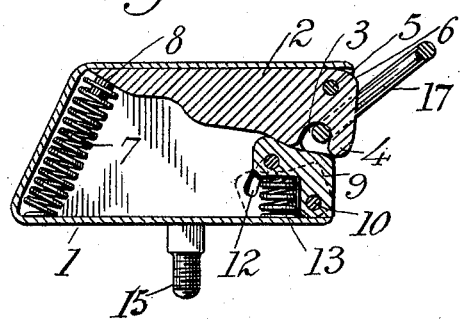 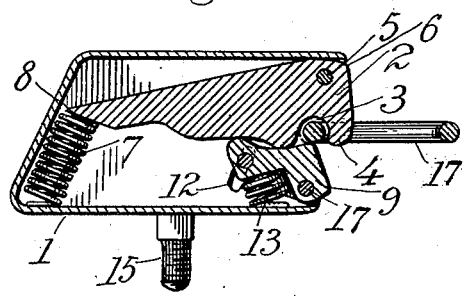
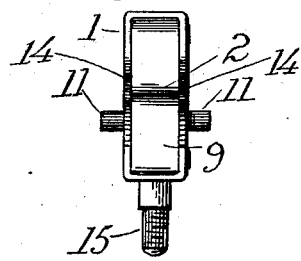
Witnesses:
J. F. Fasenmeyer, Inventor
by C. A. Snow & Co.
Attorneys

UNITED STATES PATENT OFFICE.

JOSEPH F. FASENMEYER, OF FRYBURG, PENNSYLVANIA.

CHECKREIN-HOLDER.

SPECIFICATION forming part of Letters Patent No. 685,830, dated November 5, 1901.

Application filed May 2, 1901. Serial No. 58,489. (No model.)

*To all whom it may concern:*

Be it known that I, JOSEPH F. FASENMEYER, a citizen of the United States, residing at Fryburg, in the county of Clarion and State of Pennsylvania, have invented a new and useful Checkrein-Holder, of which the following is a specification.

This invention relates to check-hooks, and has for its object to arrange for the automatic release of the checkrein should the horse stumble, thereby to free the head of the horse in order that he may recover and avoid falling. It is furthermore designed to arrange for the convenient engagement of a checkrein with the hook or holder and to avoid accidental disengagement of the checkrein by the usual movements of an animal's head.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a checkrein-holder constructed in accordance with the present invention. Fig. 2 is a central longitudinal sectional view thereof in its normal condition. Fig. 3 is a similar view illustrating the automatic release of the checkrein. Fig. 4 is a front elevation of the device.

Like characters of reference designate corresponding parts in all of the figures of the drawings.

In carrying out the present invention there is provided a substantially rectangular casing or housing 1, in the shape of a hollow oblong box, which is open at its front end only for the insertion of the parts of the device. The checkrein-hook 2 is inserted through the open front end of the casing and lies against the inner side of the top thereof. This hook is a single piece of metal that extends for nearly the entire length of the casing and has its lower edge inclined or beveled upwardly and inwardly from the outer end thereof. The outer end of the hook is substantially half as wide as the casing and is provided in its under edge with a notch or recess 3, that produces a pendent terminal hook 4. A transverse pivot-pin 5 passes through the opposite sides of the casing and the upper portion of the outer end of the hook, and the outer end portion of the said hook has the upper corner rounded or beveled, as at 6, to permit of an upward swing of the outer end of the hook. The part 2 is normally held in a substantially horizontal position by means of a stiff coiled spring 7, interposed between the bottom of the casing and the inner free end of the said part, there being a pendent projection or stud 8 carried by the rear end of the hook member and entering the upper end of the coiled or helical spring to connect the latter to the member.

The notch in the lower side of the hook member is normally closed by means of a pivotal guard member 9, that has its lower outer end pivoted to the casing, as at 10, and its rear upper end portion is provided with a pair of opposite outwardly-directed projections 11, that form finger-pieces and extend outwardly through corresponding arcuate slots 12, formed in the opposite sides of the casing and struck from the pivot of the guard as a center. In the back of the pivotal guard there is provided a socket for the reception of a helical spring 13, that bears in opposite directions against the bottom of the casing and the guard, so as to normally and yieldably hold the upper face of the guard against the notched under side of the hook member. The opposite front ends of the sides of the casing are provided with corresponding slots 14, which overlap the adjacent inner sides of the hook and the guard, so as to expose the same for access thereto.

At about the center of the bottom of the casing there is provided a pendent screw-threaded stem 15 for connecting the device to a harness-saddle in the ordinary manner.

It is preferable to have the checkrein, as illustrated at 16, provided with a terminal ring or link 17 for engagement with the device, as a metallic part can be more readily engaged than a leather loop. To facilitate the application and removal of the ring, the guard is swung downward and inward by manipulation of the projected finger-pieces, as shown in dotted lines in Fig. 2 of the drawings, without affecting the hook member 2, whereby the ring 17 may be inserted through the slots in the casing and engaged with the notch in the bottom of the hook member, after which the finger-pieces are released to permit of the guard being snapped back to its original position, thereby closing the notch in the hook member and preventing accidental displacement of the checkrein-ring. The direction of the normal pull upon the checkrein is upwardly, and the spring 7 has a tension strong enough to prevent tripping of the pivotal hook member by the ordinary movement of the horse's head; but should the animal stumble the lowering of his head will exert a powerful pull upon the checkrein in a somewhat downwardly-inclined direction, as indicated in Fig. 3, thereby overcoming the tension of the spring 7 and tripping the hook member to automatically release the checkrein. In view of the yieldable mounting of the guard the latter will be depressed by the downward swing of the rear portion of the hook member, so as to uncover the notch in the bottom of said member.

From the foregoing description it is apparent that the movable parts of the device are effectively housed within the casing, so as to be protected against displacement and also against the effects of the weather. Ordinarily the ring 17 is merely pressed inwardly against the front of the guard, which yields thereto and permits of the ring snapping into engagement with the hook member, the finger-pieces being to facilitate the tripping of the guard when it is desired to disengage the checkrein from the device.

What is claimed is—

1. A checkrein-holder comprising a casing, a hook member pivotally mounted in the upper portion of said casing and having a spring engaging the rear portion thereof, the lower front extremity of the hook member having a notch, and a guard pivotally mounted in the casing below the hook member and normally closing the notch in the said hook member, said guard being spring-actuated.

2. A checkrein-holder, consisting of a casing, an upper elongated hook member, which is pivoted at one end to said casing and provided with a notch in its under side and adjacent to the pivotal support, a strong spring applied to the opposite free end of the member to yieldably hold the same in its normal position, and a movable guard located below and of considerably smaller dimensions than said hook member and constructed to normally close the notch of the hook member.

3. A checkrein-holder, comprising a casing having an open end, a hook member within the casing, pivoted at its outer end, and provided with a notch in its under side and adjacent to the pivotal support, a spring applied to the inner free end of the hook member to hold the same yieldably in its normal position, and an elastically-yieldable guard constructed to normally close the notch, and having a finger-piece projected outwardly through a slot in the casing.

4. A checkrein-holder, comprising a casing having an open end, which is provided with corresponding slots in the opposite sides thereof, a hook member lying longitudinally within the top of the casing, pivotally supported at its outer end and having a notch formed in its under side and adjacent to its pivotal support, a powerful spring interposed between the inner free end of the member and the bottom of the casing, a guard member pivoted at its lower outer end portion within the front of the casing, with its upper face normally closing the notch in the hook member, a spring interposed between the inner free end portion of the guard and the bottom of the casing to normally hold the guard yieldably against the hook member, and oppositely-projected lateral finger-pieces carried by the guard and working in slots formed in the opposite sides of the casing, the corresponding slots or bifurcations in the front of the casing exposing the adjacent outer end portions of the hook and guard members.

In testimony that I claim the foregoing as my own I have hereto affixed my signature in the presence of two witnesses.

JOSEPH F. FASENMEYER.

Witnesses:
JACOB FALLER,
JOHN SILZLE.